(12) United States Patent
Pomeroy

(10) Patent No.: US 12,393,039 B2
(45) Date of Patent: Aug. 19, 2025

(54) FACE ENGAGING STRUCTURE

(71) Applicant: Apple Inc., Cupertino, CA (US)

(72) Inventor: Shannon Pomeroy, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/435,974

(22) Filed: Feb. 7, 2024

(65) Prior Publication Data

US 2024/0295740 A1  Sep. 5, 2024

Related U.S. Application Data

(60) Provisional application No. 63/487,807, filed on Mar. 1, 2023.

(51) Int. Cl.
G02B 27/01 (2006.01)

(52) U.S. Cl.
CPC ................. G02B 27/0176 (2013.01)

(58) Field of Classification Search
CPC ................................. G02B 27/0176
See application file for complete search history.

(56) References Cited

U.S. PATENT DOCUMENTS

| | | | |
|---|---|---|---|
| 2017/0216099 A1* | 8/2017 | Saladino | A42B 1/247 |
| 2018/0046147 A1* | 2/2018 | Aghara | G06F 3/012 |
| 2020/0093200 A1* | 3/2020 | Mohapatra | A41D 13/0155 |
| 2020/0233453 A1 | 7/2020 | Hatfield et al. | |
| 2022/0004010 A1 | 1/2022 | Liao et al. | |
| 2022/0382062 A1* | 12/2022 | Cheng | G02B 27/0093 |
| 2024/0103282 A1* | 3/2024 | Law | G02C 5/126 |

FOREIGN PATENT DOCUMENTS

| | | |
|---|---|---|
| CN | 205899153 U | 1/2017 |
| CN | 210270381 U | 4/2020 |

OTHER PUBLICATIONS

PCT/US2024/018239, Invitation to Pay Additional Fees and, Where Applicable, Protest Fee, Jun. 27, 2024, 12 pages.
International Search Report and Written Opinion for PCT/US2024/018239 dated Sep. 5, 2024.

\* cited by examiner

*Primary Examiner* — Muhammad N Edun
(74) *Attorney, Agent, or Firm* — Dorsey & Whitney LLP

(57) ABSTRACT

A head-mountable device can include: a display portion including a display; a pneumatic facial interface; and a securement assembly connectable to the display portion. In some examples, the securement assembly includes: a removable strap comprising an electronics pod; and a retention band connectable to the removable strap.

19 Claims, 6 Drawing Sheets

FACE ENGAGING STRUCTURE

CROSS-REFERENCE TO RELATED APPLICATION(S)

This claims priority to U.S. Provisional Patent Application No. 63/487,807 filed 1 Mar. 2023 and entitled "FACE ENGAGING STRUCTURE," the entire disclosure of which is hereby incorporated by reference in its entirety.

FIELD

The described embodiments relate generally to facial interfaces of a head-mountable device. More particularly, the present embodiments relate to facial interfaces of a head-mountable device that can provide increased comfort and flexure.

BACKGROUND

Recent advances in portable computing have enabled head-mountable devices that provide augmented and virtual reality (AR/VR) experiences to users. Such head-mountable devices typically include various components such as a display, viewing frame, lens, battery, motor, speaker, and other components. These components can operate together to provide an immersive user experience. In particular, head mountable-devices include components that help provide a distraction-free setting by blocking or sealing out the outer environment (e.g., ambient light).

Additionally, users have myriad different anatomical features, including head size, eye location, cheek and forehead bone structure, and so forth. Unfortunately, conventional head-mountable devices fail to provide a custom, comfortable fit for a fully immersive experience. Indeed, conventional head-mountable devices have rudimentary customization features (if any). For example, users of a conventional head-mountable device may have differing facial structures that the head-mountable device cannot accommodate. This user-to-user variation can create a poor user experience, causing pressure on a user's face from the head-mountable device. Additionally, longer durations of wear can exacerbate ill-fitting conventional head-mountable devices. Therefore, a head-mountable device capable of dynamically adapting to different user facial profiles is desired. Likewise, a head-mountable device capable of mitigating one or more effects of prolonged use is desired.

SUMMARY

An aspect of the present disclosure relates to a head-mountable device. The head-mountable device can include a display portion including a display, a facial interface including at least one of a gas or a liquid disposed in a chamber extending at least partially around the facial interface, and a securement assembly connectable to the display portion. In some examples, the securement assembly includes a removable strap including electronics, and a retention band connectable to the removable strap.

In one or more examples, the facial interface includes a first pneumatic chamber, and a second pneumatic chamber positioned adjacent to the first pneumatic chamber. In some examples, the first pneumatic chamber and the second pneumatic chamber are independently actuatable. Further, in some examples, the facial interface includes a pneumatic chamber configured to span a forehead region, a zygoma region, and a maxilla region of a human face. In at least some examples, the facial interface includes a pneumatic ring, and a set of pneumatic extensions in fluid communication with the pneumatic ring. In one or more examples, the head-mountable device further includes a fan to push air through the facial interface. In certain examples, the securement assembly comprises a pneumatic chamber extending from the display portion and through the retention band.

Another aspect of the present disclosure relates to an apparatus that includes a display portion including a display and a pneumatic interface. In some examples, the pneumatic interface includes a first pneumatic chamber, and a second pneumatic chamber adjacent to the first pneumatic chamber, wherein the first pneumatic chamber and the second pneumatic chamber are independently actuatable. The apparatus can further include a securement assembly connectable to the display portion.

In some examples, the first pneumatic chamber and the second pneumatic chamber each comprise a set of pneumatic extensions. In particular examples, the set of pneumatic extensions of the first pneumatic chamber extend outwardly towards the second pneumatic chamber. Additionally, in some examples, the set of pneumatic extensions of the second pneumatic chamber extend inwardly towards the first pneumatic chamber.

In at least some examples, the sets of pneumatic extensions for the first pneumatic chamber and the second pneumatic chamber define an alternating pneumatic region between the first pneumatic chamber and the second pneumatic chamber. In certain examples, the first pneumatic chamber and the second pneumatic chamber are actuatable at predetermined time intervals. In particular examples, the first pneumatic chamber and the second pneumatic chamber are actuatable in response to a signal from a processor. In one or more examples, the signal is generated in response to a detected facial fatigue or a detected temperature. In one example, the first pneumatic chamber and the second pneumatic chamber are expandable and compressible to vary contact points between the pneumatic interface and a human face.

Yet another aspect of the present disclosure relates to a wearable apparatus. The wearable apparatus includes a display portion including a display and a pneumatic facial interface. The pneumatic facial interface can include a pneumatic ring, and a set of pneumatic extensions in fluid communication with the pneumatic ring. In some examples, the wearable apparatus further includes a securement assembly connectable to the display portion.

In one or more examples, the wearable apparatus further includes an additional pneumatic ring, and an additional set of pneumatic extensions in fluid communication with the additional pneumatic ring. In some examples, the wearable apparatus further includes an air intake in fluid communication with the pneumatic ring, and an air exhaust in fluid communication with the pneumatic ring. In at least some examples, the pneumatic facial interface is actuatable based on detected blood flow. In one example, the securement assembly includes an adjustable tension mechanism with a pneumatic chamber.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Representative embodiments are illustrated in the accompanying drawings and detailed below. The following descriptions are merely exemplary and are not intended to limit the examples to one preferred embodiment. Rather, they are intended to cover alternatives, modifications, and equivalents contemplated within the spirit and scope of the examples provided and as defined by the appended claims.

The following disclosure relates to a head-mountable device with one or more fluid chambers (e.g., pneumatic chambers or rings). A fluid chamber can be positioned on or within a facial interface. In this configuration, the fluid chamber can provide varying contact points between the facial interface and a user's face. In so doing, the fluid chamber can help prevent pressure points and dynamically change the force distribution profile when the device is donned to help reduce user fatigue (particularly over extended use durations). This dynamic alteration of pressure and contact points can also mitigate or reduce a user's desire to shift the device (or remove the device all together) when the device is donned.

In a same or similar manner, fluid chambers can be positioned at other portions of the device. For example, a retention band at the rear of a user's head can likewise implement fluid chambers to subtly change blood flow and/or change local tissue contact points.

In these or other examples, fluid chambers of the present disclosure can include a variety of configurations and positioning. In some examples, a facial interface implements a single fluid chamber. In other examples, a facial interface implements multiple fluid chambers (e.g., to alternate expansion and contraction) from one fluid chamber to the other. In specific implementations, a facial interface can implement a fluid chamber with extensions that mesh with another fluid chamber's extensions (e.g., in an alternating finger pattern).

These and other embodiments are discussed below with reference to FIGS. 1-6. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
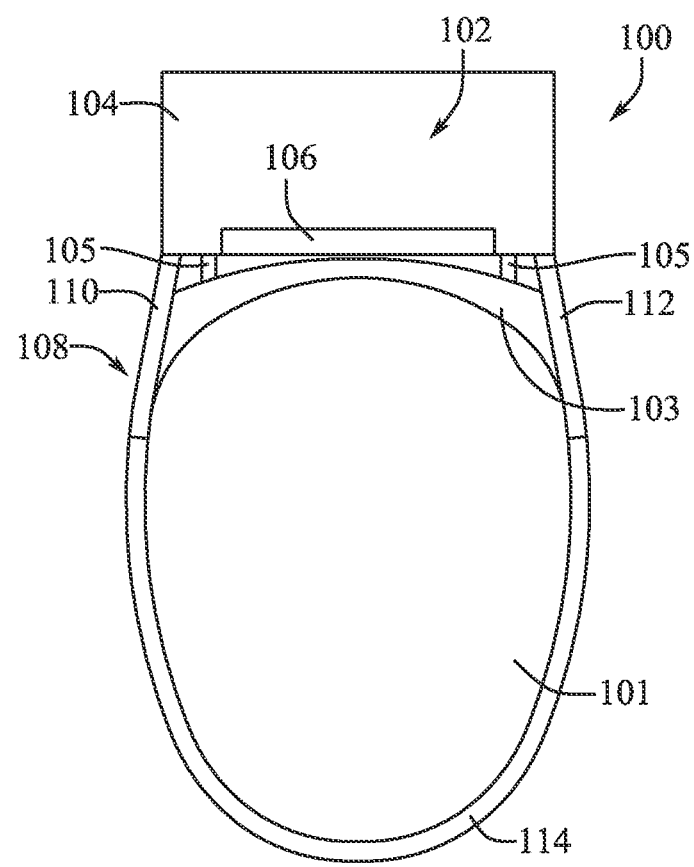
FIG. 1 shows a top view of an example head-mountable device being worn on the head of a user.

FIG. 1 shows a top view of a head-mountable device 100 being worn on the head 101 of a user. The head-mountable device 100, as well as other wearable electronic devices disclosed herein, can also be referred to as HMD systems, electronic devices, or simply as devices. The device 100 can include a number of components, including modular components, interchangeable components, etc. For example, the device 100 can include a head-mounted display (HMD) 102, which includes a housing 104 and a display 106 attached to the housing 104 for displaying images to a user.

The HMD can also be referred to as a display portion or display module having the display 106. The display portion can include the housing 104 and the display 106 that at least partially constitutes the HMD. In one or more examples, including the example shown in FIG. 1 and other examples shown in other figures, the HMD 102 can also be referred to as an output component or output module. Such output components, modules, or portions can include one or more outputs other than visual outputs from a display. For example, an output module similar to the HMD 102 can include a speaker that outputs sound instead of or in addition to the display 106 shown in FIG. 1. As another example, HMD 102 (as an output module) can include a haptic interface for generating vibrations or other sensory outputs.

The head-mountable device 100 also includes a facial interface 103. As used herein, the terms "facial interface" or "interface" refer to a portion of the head-mountable device 100 that engages a user face via direct contact. In particular, a facial interface includes portions of the head-mountable device 100 that conform to (e.g., compress against) regions of the user face. For example, a facial interface may include a pliant (or semi-pliant) face track that spans the forehead, wraps around the eyes, contacts the zygoma and maxilla regions of the face, and bridges the nose. Furthermore, a facial interface can include various components forming a structure, webbing, cover, fabric, or frame of a head-mountable device disposed between the HMD 102 and the user skin. In particular implementations, a facial interface can include a seal (e.g., a light seal, environment seal, dust seal, air seal, etc.). It will be appreciated that the term "seal" can include partial seals or inhibitors, in addition to complete seals (e.g., a partial light seal where some ambient light is blocked and a complete light seal where all ambient light is blocked when the head-mountable device is donned).

As will be discussed more below in relation to subsequent figures, the facial interface 103 can comprise fluid. Thus, the term "fluid facial interface" refers to a facial interface as described above that comprises a fluid. Likewise, the term "pneumatic facial interface" refers to a facial interface described above that comprises air. Further, the term "hydraulic facial interface" refers to a facial interface described above that comprises liquid.

Relatedly, as used herein the term "fluid" refers to a gas (e.g., an element or combination of elements in the gaseous state, such as ambient air) or a liquid (e.g., an element or combination of elements in the liquid state, such as oil). A liquid can also include a colloidal system in which a solid element is mixed with, at least partially dissolved in, or distributed throughout a liquid. Examples of fluids can include ambient air, carbon dioxide, aerosols, water, pastes, creams, gels, liquid suspensions, etc. Fluids can also include combinations of solutions, such as a gas-liquid solution (e.g., carbon dioxide in water).

In addition, the head-mountable device 100 includes connector(s) 105. As used herein, the terms "connector" or "joint" refer to a joining between the HMD 102 and the facial interface 103. In some examples, a connector allows the facial interface 103 to translate or rotate relative to the HMD 102 via the connector. In other examples, a connector allows the facial interface 103 to both translate and rotate relative to the HMD 102. In at least some examples, the facial interface 103 can be removably attach to and detach from the connector(s) 105 (or another portion of the HMD 102). For instance, in certain cases, the facial interface 103 can be swapped out for a different facial interface. In other examples, the facial interface 103 is permanently attached to the connector(s) 105. In particular implementations, the connector(s) 105 moveably constrain the facial interface 103 to the HMD 102 at one or more various positions, such as a forehead region, a zygoma region, or a maxilla region.

As used herein, the term "forehead region" refers to an area of a human face between the eyes and the scalp of a human. Additionally, the term "maxilla region" refers to an area of a human face corresponding to the zygomatic bone structure of a human. Similarly, the term "maxilla region" refers to an area of a human face corresponding to the maxilla bone structure of a human. It will be appreciated that the foregoing regions can correspond to particular structure of the head-mountable device 100. However, such structure of the head-mountable device 100 is not dependent on a face or a user.

In addition, one example of the device 100 can include a securement assembly 108 that secures the HMD 102 to the user's head 101. The securement assembly 108 includes removable straps 110, 112. As used herein, the term "removable strap" refers to an element (e.g., a band, connection piece, etc.) that couples the HMD 102 and the retention band 114. In particular examples, the removable straps 110, 112 removably (i.e., detachably) connect to both of the HMD 102 and the retention band 114. For example, each of the removable straps 110, 112 can be removably connected to the HMD 102 (or the housing or the display portion thereof) and the retention band 114 at opposing ends of each removable strap 110, 112 as shown in FIG. 1. In such an example, the securement assembly 108 is modular in that each of the removable straps 110, 112, and the retention band 114 can be connected and detached, as may be desired. For instance, each of the removable straps 110, 112 can be removed from the securement assembly 108 and swapped out for one or more other modules, straps, or electronic components.

In these or other examples, at least one of the removable straps 110, 112 can include connectors or ports for data and/or power transmission (e.g., via dongles or tethers). For instance, the removable straps 110, 112 can couple to an external device or display. In another instance, the removable straps 110, 112 can couple to a power supply.

Figure 2A:
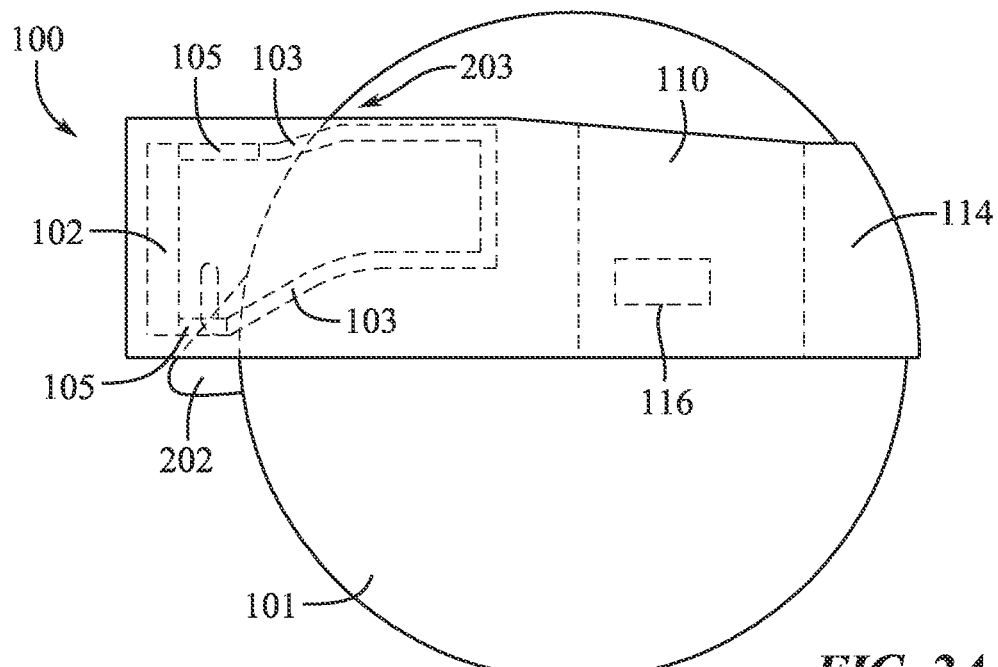
FIGS. 2A-2B respectively illustrate side and front view profiles of an example head-mountable device.

In certain examples, the removable straps 110, 112 include an electronics pod 116 (shown in FIG. 2A). As used herein, the term "electronics pod" refers to a subassembly, an enclosure, or a shell dedicated for housing certain electronics. Some example electronics include a speaker, memory device, processor, controller, system on chip, printed circuit board, etc. In particular implementations, electrical components of the electronics pod are communicatively coupled to the HMD 102 (e.g., via one or more cables). Additionally or alternatively, the electronics pod can be coupled to one or more dongles.

The securement assembly 108 further includes a retention band 114. As used herein, the term "retention band" refers to a securing element that helps positionally secure the device 100 in place. A retention band can include a band, tie, or other securement element (e.g., to secure the device 100 on or around the user's head 101). Additionally, a retention band can be formed of a variety of materials, such as knit fabric, silicone, foam, etc. In some examples, a retention band can be loosened or tightened for comfort and proper fit. The securement assembly 108 is therefore configured to removably secure the head-mountable device 100, including the HMD 102, to the head 101 of the user when the removable straps 110, 112 and retention band 114 are connected as shown in FIG. 1.

One or more other examples of the device 100 can include alternative configurations of the removable straps 110, 112 shown in FIG. 1. For example, the device 100 can be positioned elsewhere along the securement assembly 108 (differently than what is shown in FIG. 1). In addition, one or more examples of wearable electronic devices described herein can include one or more intermediate members, flexible straps, or other optional supplemental components and electronic modules such as external power supplies, memory components, and/or processors.

In the example shown in FIG. 1, when the device 100 is worn on the head of the user, the removable strap 110 is positioned on the left side of the user's head and the removable strap 112 is positioned on the right side of the user's head. The retention band 114 can span between the removable straps 110, 112 to wrap around the back of the user's head 101, as shown.

In some examples, and as shown, the device 100 can be worn on the user's head 101 such that the HMD 102 is worn on the user's face and disposed over one or both of their eyes. The HMD 102 can be removably and/or releasably connected to one or more of the removable straps 110, 112 as mentioned above. In some examples, the removable straps 110, 112 can be positioned against the side of a user's head 101 and in contact therewith. In some examples, the removable straps 110, 112 can be positioned above the user's ear or ears. In some examples, the removable straps 110, 112 can be positioned adjacent to the user's ear or ears. The removable straps 110, 112 can be removably connected to the retention band 114, which can extend around the user's head 101 and removably connect to the other of the removable straps 110, 112. In this way, the HMD 102, removable straps 110, 112, and retention band 114 can form a loop that can retain the device 100 on the user's head 101.

As mentioned, the removable straps 110, 112 can connect to the HMD 102, both mechanically and electrically. In particular examples, the removable straps 110, 112 can receive and/or relay at least one of data or power via such connections. In these or other examples, the removable straps 110, 112 can connect to the HMD 102 at an HMD connection location that can include an electrical input or electrical connector that is attached to the housing 104 and electrically connected to the display 106. This location can be identified as a temple area that can be defined as an area near a user's temple adjacent to the user's eye and can span from in front of the user's eye to approximately 1-1.5 inches past the outer corner of a user's eye, along the side of the user's head 101.

Similarly, the removable straps 110, 112 can connect to the retention band 114 at a retention band connection location identified as an area that can span to include the area above the user's ear or within 0.5 inches of the outer edge of the ear on either side. In this manner, the removable straps 110, 112 are able to provide structural support between the HMD 102 and the user's ear, while securely connecting the retention band 114 and transferring the retention forces of the retention band 114 through the device 100. It should be understood, however, that this configuration is just one example of how the components of the head-mountable device 100 can be arranged, and that in some, a different number of removable straps and/or retention bands can be included.

While a user wearing an HMD 102 on his or her head 101 is shown as one example of a wearable electronic device, the modular components, features, and advantages of various examples of electronic devices disclosed herein can also apply to other wearable electronic devices having securement mechanisms, including but not limited to wearable smart watches, fitness trackers, smart glasses, medical monitor devices, and so forth. For example, the housing 104 and display 106 of HMD 102 shown in FIG. 1 can also be configured as a housing and display for a smart watch module secured to the user's arm or wrist via a securement mechanism or assembly similar to the securement assembly 108 shown in FIG. 1. Although referred to as a head-mountable device 100, it should be understood that the device 100 can include multiple modular components or devices and can be interchangeably referred to as a wearable electronic device, wearable apparatus, wearable electronic device system, and/or wearable electronic system. Additionally, although the particular component 102 can be referred to as an HMD, it should be understood that the terms HMD, HMD device, and/or HMD system can be used to refer to the device 100 as a whole.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1.

Figure 2B:
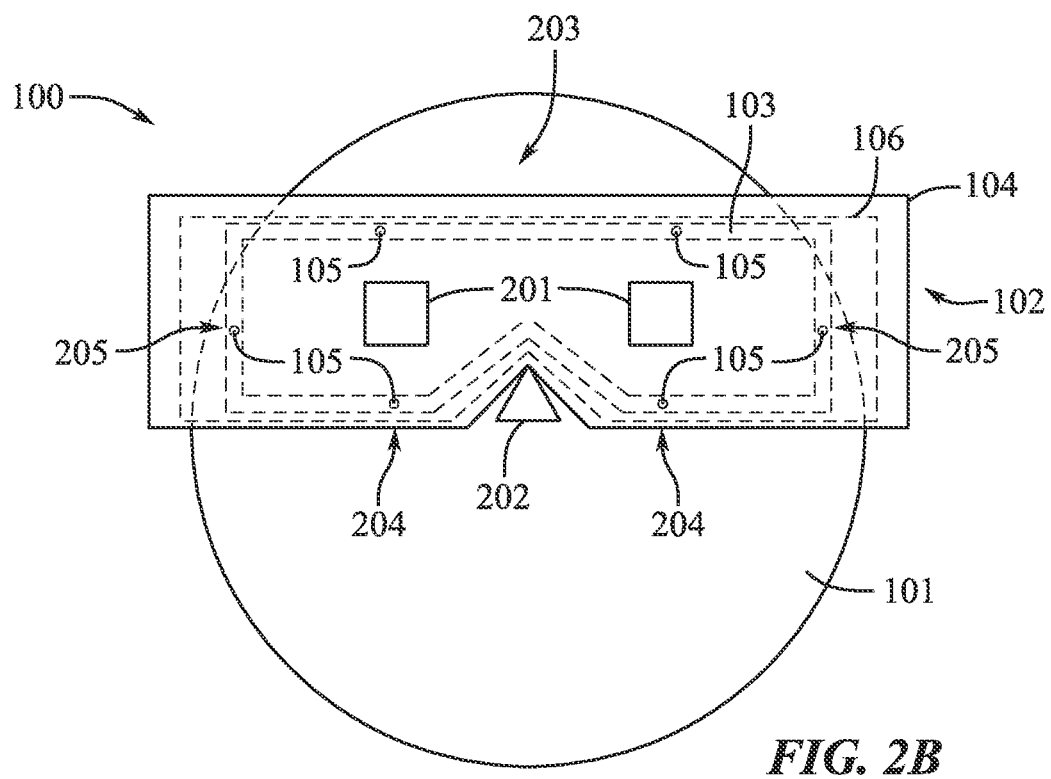

FIGS. 2A-2B respectively illustrate side and front view profiles of an example of the head-mountable device 100. As discussed above, the head-mountable device 100 includes the HMD 102 (which includes the housing 104 and the display 106), the facial interface 103, and the connector(s) 105. In particular, as shown in FIGS. 2A-2B, the facial interface 103 can have a variety of contact points with a human face (or in alternative examples, other body portions such as a wrist). Moreover, as will be discussed below, the facial interface 103 can dynamically change contact points with a human face (e.g., in real-time responsive to detected tissue fatigue, detected temperature, detected blood flow, user input, a lapse of a predetermined amount of time, etc.).

As used herein, the term "contact point" refers to a particular tissue area and/or bony structure engaged (e.g., touched or compressed against) by the facial interface 103. For instance, the facial interface 103 comprises contact points that include areas around the eyes 201, over the nose 202, span the forehead region 203, and touch a maxilla region 204 and a zygoma region 205. The foregoing examples of contact points correspond to global facial areas and facial anatomy. However, contact points can also refer to more granular positioning and localized touchpoints. For instance, a contact point can refer to a first tissue portion on one side of a blood vessel, and another contact point can refer to a second tissue portion on the other side of the blood vessel. In another instance, a contact point can reference one or more skin pores, and another contact point can reference another one or more skin pores.

Additionally shown in FIG. 2B are some example locations of the connector(s) 105. In particular examples, the connector(s) 105 are located at the forehead region 203, the maxilla region 204, and the zygoma region 205. Other locations of the connector(s) 105 are herein contemplated. However, the connector(s) 105 in at least these positions can provide a dynamic, yet stable connection between the HMD 102 and the facial interface 103. In alternative implementations, one or more of the connector(s) 105 can be omitted.

For instance, the facial interface 103 can include dynamic loading capabilities that allow for intentional (and varied) pressure loading against the human face without the need for fixed connectors or posts at one or more specific facial regions. In certain implementations, modifying the fluidity (e.g., the gas or liquid properties) of the facial interface 103 can provide such a dynamic response with the human face.

It will be appreciated that the connector(s) 105 at the different locations can be the same, or in certain cases, different. For instance, the connector(s) 105 can include a first joint (e.g., socket joint, soft joint, molded hinge joint, butterfly flexure joint, cam pivot joint, cross axis pivot joint, etc.) positioned at the forehead region 203. In addition, the connector(s) 105 can include a second joint, different from the first joint, such as a pivot joint, elastomer spring joint, soft joint, single ball joint, etc. Indeed, different arrangements and types of the connector(s) 105 can be implemented to provide a particular force profile, amount of rigidity, etc.

Any of the features, components, and/or parts, including the arrangements and configurations thereof shown in FIGS. 2A-2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A-2B.

Figure 3:
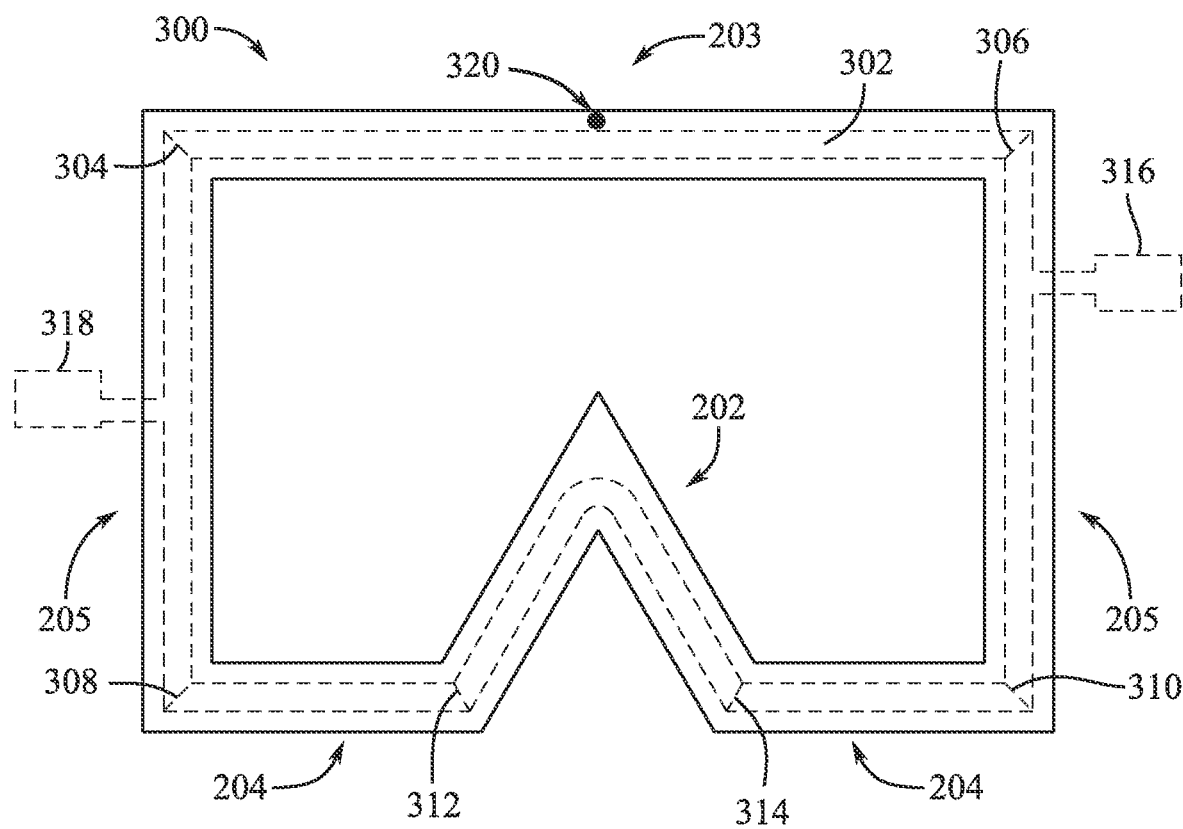
FIG. 3 illustrates an example facial interface.

FIG. 3 illustrates a facial interface 300 in accordance with one or more examples of the present disclosure. As shown, the facial interface 300 includes a fluid chamber 302. As used herein, the terms "fluid chamber" or "fluid ring" refer to an element configured to maintain and/or move at least one of a liquid or gas at least partially around the facial interface or through a securement assembly (e.g., over and across certain tissue area(s)). In one or more examples, a fluid chamber or fluid ring comprises a continuous element in fluid communication from one end to another end, unlike a closed-cell foam, for instance. In particular examples, a fluid chamber comprises a pneumatic chamber (or pneumatic ring) configured to maintain and/or move a gas from one portion of the pneumatic chamber to another portion of the pneumatic chamber. In other examples, a fluid chamber comprises a liquid chamber (or liquid ring) configured to maintain and/or move a liquid from one portion of the liquid chamber to another portion of the liquid chamber. In these or other examples, the fluid chamber 302 can take on various forms and configurations, such as a bladder, elastic (e.g., expandable and compressible) veins, passageways, inflatable portions, etc. In some examples, the fluid chamber 302 is resilient to deformation, force, pressure, or manipulation.

The fluid chamber 302 can include a variety of positional configurations and orientations. As shown, the fluid chamber 302 spans around the facial interface 300 in correspondence with certain facial anatomy. In particular implementations, the fluid chamber 302 spans across the forehead region 203, around the zygoma region 205, around the maxilla region 204, over the nose 202, around the other maxilla region 204, around the other zygoma region 205, and back to the forehead region 203. However, other implementations are also herein contemplated. For instance, the fluid chamber 302 can span across one or two specific facial regions, but not others. To illustrate, the fluid chamber 302 can traverse along the maxilla region 204 and the zygoma region 205, but not the forehead region 203. Still, in other implementations, multiple fluid chambers can be utilized (as discussed below in relation to FIGS. 4-5).

Additionally, the fluid chamber 302 can be positioned internally or externally relative to the facial interface 300. For example, the fluid chamber 302 can be embedded inside the facial interface 300. In other examples, the fluid chamber 302 is positioned on an external surface of the facial interface 300. In such a case, the fluid chamber 302 can directly interface or contact a human face.

In these or other examples, the fluid chamber 302 can include a closed-loop system or an open-loop system. In the closed-loop system, the fluid chamber 302 can include a predetermined volume of gas or liquid that is fixed within the fluid chamber 302. That is, in the closed-loop system, the fluid chamber 302 permanently maintains an amount of gas or liquid that does not exit the fluid chamber 302. In the open-loop system, the fluid chamber 302 can bring in fluid and exit fluid based on a variety of system factors discussed below. For instance, the fluid chamber 302 can pull in ambient air from the environment and exhaust air that has circulated at least a portion of the fluid chamber 302.

A variety of mechanisms can be implemented for closed-loop systems and open-loop systems. These mechanisms can be positioned on or within the facial interface 300. Additionally or alternatively, such mechanisms can be positioned external to the facial interface 300. For instance, these mechanisms can be positioned within other portions of the HMD 102, within the removable straps 110, 112, or within the retention band 114. In these or other examples, mechanisms for closed-loop systems and open-loop systems are in fluid communication with the fluid chamber 302.

The term "fluid communication" refers to the ability to flow fluid between components or mechanisms. Components or mechanisms in fluid communication can thus receive fluid from and/or send fluid to each other. It will be appreciated, however, that components or mechanisms in fluid communication need not require active operations (e.g., the receipt, storage, or transmission of fluid). For instance, fluid can passively pass through components or mechanisms that are in fluid communication with each other.

One example mechanism includes control valves 304-314. The control valves 304-314 are optional mechanisms. A control valve can allow one-way (i.e., uni-directional) fluid flow or two-way (i.e., bi-directional) fluid flow. In particular examples, a control valve can also regulate (or manipulate) pressure and/or flow rate. In these or other examples, a control valve can be actuated (e.g., opened, closed, and/or moved to a partially opened/closed position) electrically, pneumatically, or hydraulically.

In at least some examples, the control valves 304-314 can be implemented to induce or maintain a particular amount of fluid at one or more portions of the fluid chamber 302. To illustrate, the control valves 304-306 can be implemented to control fluid into or out of a portion of the fluid chamber 302 corresponding to the forehead region 203. As another example, the control valves 306, 310 can be implemented to control fluid into or out of a portion of the fluid chamber 302 corresponding to the zygoma region 205. Likewise, the control valves 310, 314 can be implemented to control fluid into or out of a portion of the fluid chamber 302 corresponding to the maxilla region 204, and so forth along the fluid chamber 302. In this manner, one or more of the control valves 304-314 can cause the fluid chamber 302 to inflate or expand in certain portions while remaining less inflated or less expanded in other portions. In so doing, the fluid chamber 302 can vary the contact points of the facial interface 300 with a human face. Additionally or alternatively, the fluid chamber 302 can vary the pressure distribution of the facial interface 300 to a human face (e.g., offload forehead pressure to the maxilla or zygoma regions).

Additionally shown in FIG. 3, other mechanisms can include a fan 316. As used herein, the term "fan" refers to an element that can push or move a fluid, such as air. In one or more examples, the fan 316 is in fluid communication with a fluid chamber (e.g., the fluid chamber 302). Therefore, the fan 316 can push air through the fluid chamber 302. In certain examples, the fan 316 pushes temperature-regulated air. For instance, the fan 316 pushes cooled (e.g., refrigerated) air or heated air through the fluid chamber 302.

An intake can be implemented in addition to (or alternatively to) the fan 316. As used herein, the term "intake" refers to any component configured to bring a fluid into the fluid chamber 302. Examples of an intake include a pump, turbine, mechanical ventilation, etc.

Further shown in FIG. 3, additional mechanisms can include an exhaust 318. As used herein, the term "exhaust" refers to any element configured to recycle (e.g., filter, recirculate) or exit a fluid that has at least partially circulated through a fluid chamber (e.g., the fluid chamber 302). In particular examples, an exhaust includes an exit aperture (e.g., a one-way exit aperture to the ambient environment). In certain examples, an exhaust includes a post-circulation bladder.

A variety of triggers can cause a fluid to circulate through the fluid chamber 302. In particular, various triggers can cause the fan 316 and/or the exhaust 318 to actuate. As used herein, the term "actuate" refers to the initiation (or stopping) of a circulation cycle, a pumping cycle, an expansion cycle, etc. of a fluid inside a fluid chamber. Additionally or alternatively, the term actuate includes the manipulation of a fluid chamber (e.g., in response to operation of a fluid component, such as a control valve or fan).

In some examples, the fluid chamber 302 can actuate at predetermined time intervals. As used herein, the term "predetermined time intervals" refers to a scheduled time or a set amount of lapsed time. For example, the fluid chamber 302 can actuate every 5 minutes, every fifteen minutes, every thirty minutes, etc. during wear of the HMD system. As another example, the fluid chamber 302 can actuate at scheduled times (e.g., according to user settings). For instance, the fluid chamber 302 can actuate at 12:00 pm, at 12:45 pm, at 1:00 pm, at 1:10 pm, and so forth.

In other examples, the fluid chamber 302 can actuate in response to a signal from a processor (e.g., a system-on-chip, integrated circuit, driver, application processor, cross-over processor, etc.). The processor can generate and transmit a signal (e.g., computer-executable instructions) based on sensor data from one or more sensors (e.g., the sensor 320). As shown the sensor 320 is positioned at the forehead region 203. Additional or alternative sensors can be positioned in other areas around the facial interface 300, depending on the sensor application. In these or other examples, the sensor 320 can be embedded within the facial interface 300 (e.g., a contactless, sub-surface sensor). Still, in some examples, the sensor 320 can be positioned on an exterior surface (e.g., a sensor configured to be in intimate contact with human skin or a sensor configured for surface-based data collection).

Examples of sensors can include a camera or imaging device, temperature device, oxygen device, movement device, brain activity device, sweat gland activity device, breathing activity device, muscle contraction device, etc. Some particular examples of sensors include an electrooculography sensor, electrocardiography sensor, EKG sensor, hear rate variability sensor, blood volume pulse sensor, SpO2 sensor, compact pressure sensor, electromyography sensor, core-body temperature sensor, galvanic skin sensor, accelerometer, gyroscope, magnetometer, inclinometer, barometer, infrared sensor, global positioning system sensor, etc. Relatedly, the term "sensor data" can include information generated and/or transmitted by a sensor. The following indicators or triggers (e.g., detected facial fatigue, detected temperature, etc.) for generating a processor signal can be based on sensor data from one or more of the foregoing sensors.

In one example, the fluid chamber 302 can actuate in response to a detected facial fatigue. As used herein, the term "detected facial fatigue" refers to identified effects or biomarkers in tissue or nerves. For example, detected facial fatigue can be based on muscle or nerve responses (e.g., twitches or spasms). In another example, detected facial fatigue can be based on amount of deformation to tissue caused by contact with a facial interface. In yet another example, detected facial fatigue can be based on skin tone changes. Still in other examples, detected facial fatigue can be based on galvanic skin sensor readings, moisture buildup, lactic acid buildup, etc.

In the fluid chamber 302 can actuate in response to a detected temperature. As used herein, the term "detected temperature" refers to a temperature identified in connection with tissue or ambient air. In certain examples, a detected temperature can exceed or fall below a threshold temperature (e.g., a predetermined temperature). To illustrate, the fluid chamber 302 can actuate in response to an infrared sensor identifying a core body temperature in excess of 99 degrees Fahrenheit. In another example, the fluid chamber 302 can actuate in response to an ambient air temperature sensor identifying an air temperature around the user's eyes (i.e., between the user's eyes and the display portion of the HMD) exceeding 100 degrees Fahrenheit.

In certain examples, the fluid chamber 302 can actuate based on detected blood flow. As used herein, the term "detected blood flow" refers to the identified circulation of blood through tissue. Detected blood flow can be identified based on skin coloration. In certain implementations, detected blood flow can be determined based on properties of light passing through or reflecting/refracting off tissue. In particular examples, the fluid chamber 302 can actuate when the detected blood flow falls below a predetermined threshold.

In at least some examples, the fluid chamber 302 can actuate in response to user interaction. For instance, the fluid chamber 302 can actuate in response to user input with a button (e.g., a button positioned on the HMD 102 or on a surface of at least one of the removable straps 110, 112). In yet another example, the fluid chamber 302 can actuate in response to user input at an external pump in fluid communication with the fluid chamber 302. In such a case, the external pump can include a manual pump, such as a hand pump, a foot pump, or other interactive pump. In other cases, the external pump can include automated pumps, such as battery-powered pumps.

In one or more examples, the fluid chamber 302 can actuate based on user activity. As used herein, the term "user activity" refers to physical acts performed by a user (sitting, standing, walking, jumping, exercising, etc.). User activity can also include device-based operations, such as playing a game, conducting a virtual meeting, etc. User activity can also include a location or ambient environment of a user during operation or wearing of the device 100. For instance, a user activity can include being outdoors, being indoors, being in low-light conditions, being in bright-light conditions, etc. In an example use-case, the fluid chamber 302 can actuate during or after gameplay (or application use), in-between games, during pauses, etc. (e.g., to help cool down a user).

In one or more examples, the fluid chamber 302 is pre-pumped. Then, when a user dons the device 100, compression of facial anatomy against the facial interface 300 can cause the fluid chamber 302 to adjust. For instance, the fluid chamber 302 can be manipulated such that fluid moves into, out of, or inside the fluid chamber 302. In certain cases, depending on the size and shape of the facial anatomy (e.g., the prominence or lack of prominent facial structures), the fluid chamber 302 can adjust in different ways. For instance, fluid in the fluid chamber 302 may adjust upwards towards the forehead region 203 or downwards towards the zygoma region 205 and the maxilla region 204.

Additionally or alternatively, the fluid chamber 302 is pre-pumped (as just described), but the user can also mash the facial interface 300 to self-guide or manually push the fluid to achieve the desired fit and comfort. For instance, the user can apply localized compression against the facial interface 300 to cause the fluid chamber 302 to more closely conform to a particular facial region. In these or other examples, the fluid inside the fluid chamber 302 can be maintained in the desired position via one or more of the control valves 304-314. Additionally or alternatively, a viscosity of the fluid inside the fluid chamber 302 helps to maintain the fluid In one or more alternative examples (e.g., in addition to or alternatively to the fluid chamber 302), the facial interface 300 can include haptic elements for vibration generation. In particular, such haptic elements can generate massage vibrations (e.g., vibrations with amplitude noticeable to a user). Additionally or alternatively, such haptic elements can generate low-amplitude vibrations to subtly stimulate tissue and/or nerves. In particular implementations, the haptic elements can generate massage vibrations during certain breaks or pauses in use and generate low-amplitude vibrations during use (e.g., without user distraction).

In one or more alternative examples (e.g., in addition to or alternatively to the fluid chamber 302), the facial interface 300 can include magnetic components. Such magnetic components can promote increased comfort and relaxation over time and/or during extended-use sessions.

In one or more alternative examples (e.g., in addition to or alternatively to the fluid chamber 302), the facial interface 300 can include temperature coils. The temperature coils, for instance, can include inductive coils that cause a metal sheet or wire suspended in the facial interface 300 to heat up in response to an electromagnetic field generated by the inductive coils. In another example, the temperature coils can include cooling coils that remove heat from the surface of the facial interface 300.

In one or more alternative examples (e.g., in addition to or alternatively to the fluid chamber 302), the facial interface 300 can include internal tension cables. The internal tension cables can be actuated to tighten or loosen and therefore correspondingly adjust the facial interface 300. For instance, the internal tension cables can be tightened to compress an internal portion of the facial interface 300, thereby lifting a portion of the facial interface 300 away from a human face. By contrast, the internal tension cables can be loosened to decompress or expand an internal portion of the facial interface 300, thereby creating more contact between a portion of the facial interface 300 and a human face.

In yet another alternative example (e.g., in addition to or alternatively to the fluid chamber 302), the facial interface 300 can include adjustment notches. The adjustment notches can include apertures and/or hooks (or a suitable loop-and-fastener) to engage the facial interface 300. In particular examples, the facial interface 300 can be stretched or compressed at various areas to positionally align the facial interface 300 at certain adjustment notches. In so doing, the facial interface 300 can form flatter areas (at the stretched regions) and outwardly bowed areas (at the compressed regions).

In a further alternative example, (e.g., in addition to or alternatively to the fluid chamber 302), the facial interface 300 can include microfilaments that extend perpendicular to the skin-facing surface of the facial interface 300 (i.e., outwardly into a user's face). In this example, the microfilaments can include small pins positioned sufficiently close to each other such that any one pin is unintelligible from another pin. The microfilaments can therefore include a surface area density that meets or exceeds the two-point discrimination test commonly used in neurosensory tests to assess mechano-perception for facial sensory receptors. In such examples, the microfilaments move in and out (e.g., in an oscillating fashion) towards and away from the tissue. In this manner, the microfilaments can subtly actuate to vary the local contact points across the facial interface 300 and therefore the local pressure, blood flow, etc.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
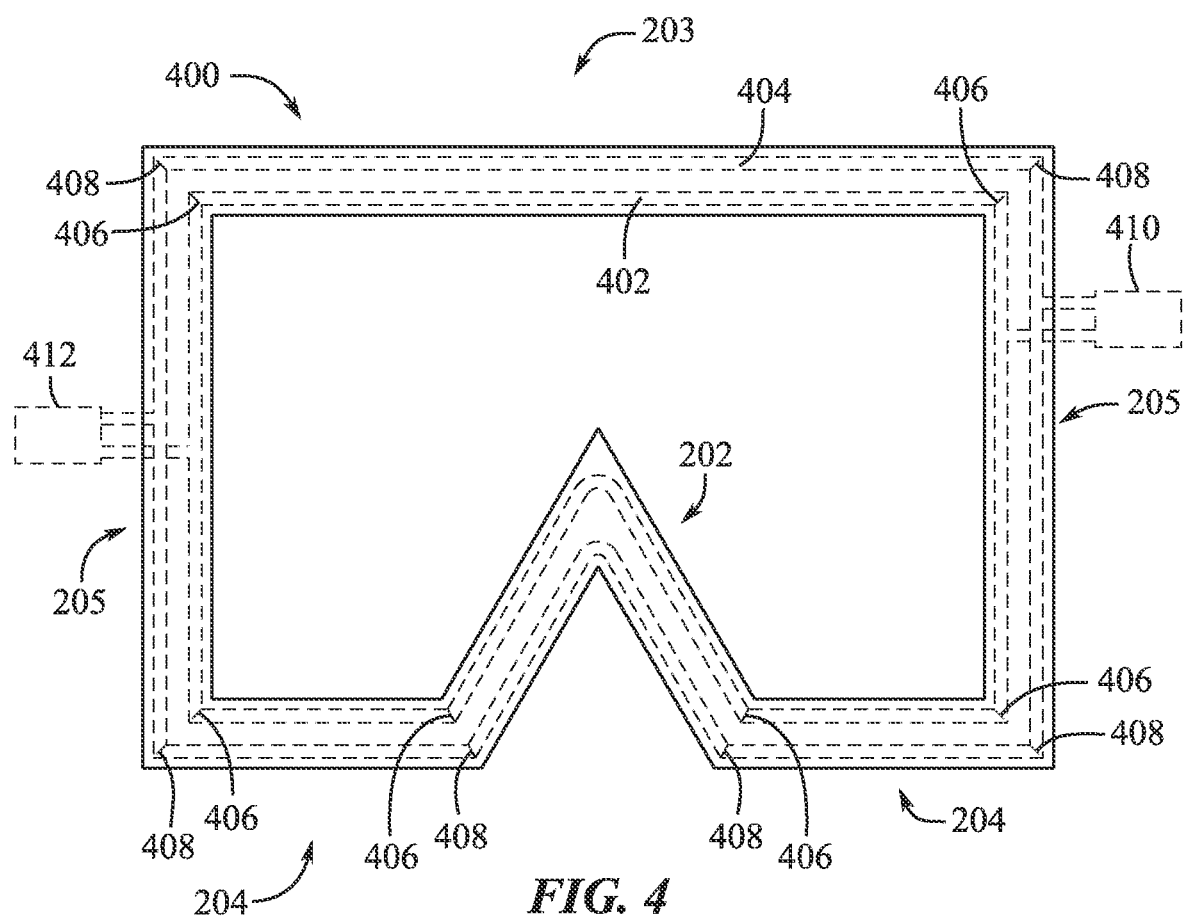
FIG. 4 illustrates another example facial interface.

Unlike FIG. 3 implementing a single fluid chamber, other implementations can include multiple fluid chambers. FIG. 4 illustrates a facial interface 400 in accordance with one or more examples of the present disclosure. As shown, the facial interface 400 comprises two fluid chambers or fluid rings—namely a first fluid chamber 402 and a second fluid chamber 404.

The first fluid chamber 402 and the second fluid chamber 404 can be the same as or similar to the fluid chamber 302 described above in relation to FIG. 3. In certain examples, the first fluid chamber 402 and the second fluid chamber 404 are the same type of fluid chamber comprising a same fluid. In other examples, the first fluid chamber 402 and the second fluid chamber 404 comprise different types of fluid chambers with different fluids.

Each of the first fluid chamber 402 and the second fluid chamber 404 can traverse various portions of the facial interface 400. As shown, however, the first fluid chamber 402 and the second fluid chamber 404 are positioned adjacent to each other and form loops around the facial interface 400. Moreover, as depicted, the first fluid chamber 402 is positioned along an inner portion of the facial interface 400. By contrast, the second fluid chamber 404 is positioned along an outer portion of the facial interface 400. Thus, the first fluid chamber 402 can comprise a perimeter that is smaller than the perimeter of the second fluid chamber 404.

In these or other examples, the first fluid chamber 402 and the second fluid chamber 404 or spatially offset from one another by a predetermined distance. The predetermined distance can be based on the size and shape of the facial interface 400. Additionally or alternatively, the predetermined distance between the first fluid chamber 402 and the second fluid chamber 404 is based on a desired amount of tissue positioned in that interstitial space. In certain examples, the facial interface 400 can provide increased contact variability by increasing the amount of tissue positioned in the interstitial space (in other words, by implementing an increased predetermined distance) between the first fluid chamber 402 and the second fluid chamber 404. By contrast, in some examples, facial interface 400 can more subtly vary the contact points by implementing a smaller predetermined distance so that a user cannot distinguish between actuation of the first fluid chamber 402 and the second fluid chamber 404.

In these or other examples, the first fluid chamber 402 and the second fluid chamber 404 can actuate at different times. For example, the first fluid chamber 402 may actuate first, thereby causing expansion or inflation of the first fluid chamber 402 via circulating fluid. After a certain amount of lapsed time (or based on predetermined schedule or other detected factor discussed above), the first fluid chamber 402 may actuate again to end a circulation or expansion cycle. In turn, the second fluid chamber 404 may actuate to begin an expansion or circulation cycle, thereby causing the second fluid chamber 404 to expand or inflate. In this manner, the first fluid chamber 402 and the second fluid chamber 404 can actuate in an oscillating or alternating fashion. In so doing, the facial interface 400 can provide varied contact points with a human face.

Still, in other examples, at least portions of the first fluid chamber 402 and the second fluid chamber 404 can actuate at the same time. For instance, the first fluid chamber 402 and the second fluid chamber 404 can pulse together. In other instances, the first fluid chamber 402 and the second fluid chamber 404 can actuate specific portions in a synchronized manner (e.g., in a massage effect or wave-like manner across the forehead region 203, around the zygoma region 205, around the maxilla region 204, over the nose 202, and so forth).

As similarly discussed above, the facial interface 400 can optionally implement one or more control valves to regulate or manipulate the passage of fluid through the first fluid chamber 402 and/or the second fluid chamber 404. For example, the first fluid chamber 402 can implement a set of control valves 406 in the same or similar manner as discussed above for the control valves 304-314 of FIG. 3. Likewise, the second fluid chamber 404 can implement a set of control valves 408 in the same or similar manner as discussed above for the control valves 304-314 of FIG. 3.

Additionally or alternatively, the facial interface 400 can implement other mechanisms, such as a fan 410 and/or an exhaust 412. The fan 410 and the exhaust 412 can operate in the same or similar manner as the fan 316 and the exhaust 318, respectively, discussed above in relation to FIG. 3. In particular, the fan 410 can be in fluid communication with the first fluid chamber 402 and the second fluid chamber 404. Additionally, the exhaust 412 can be in fluid communication with the first fluid chamber 402 and the second fluid chamber 404.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
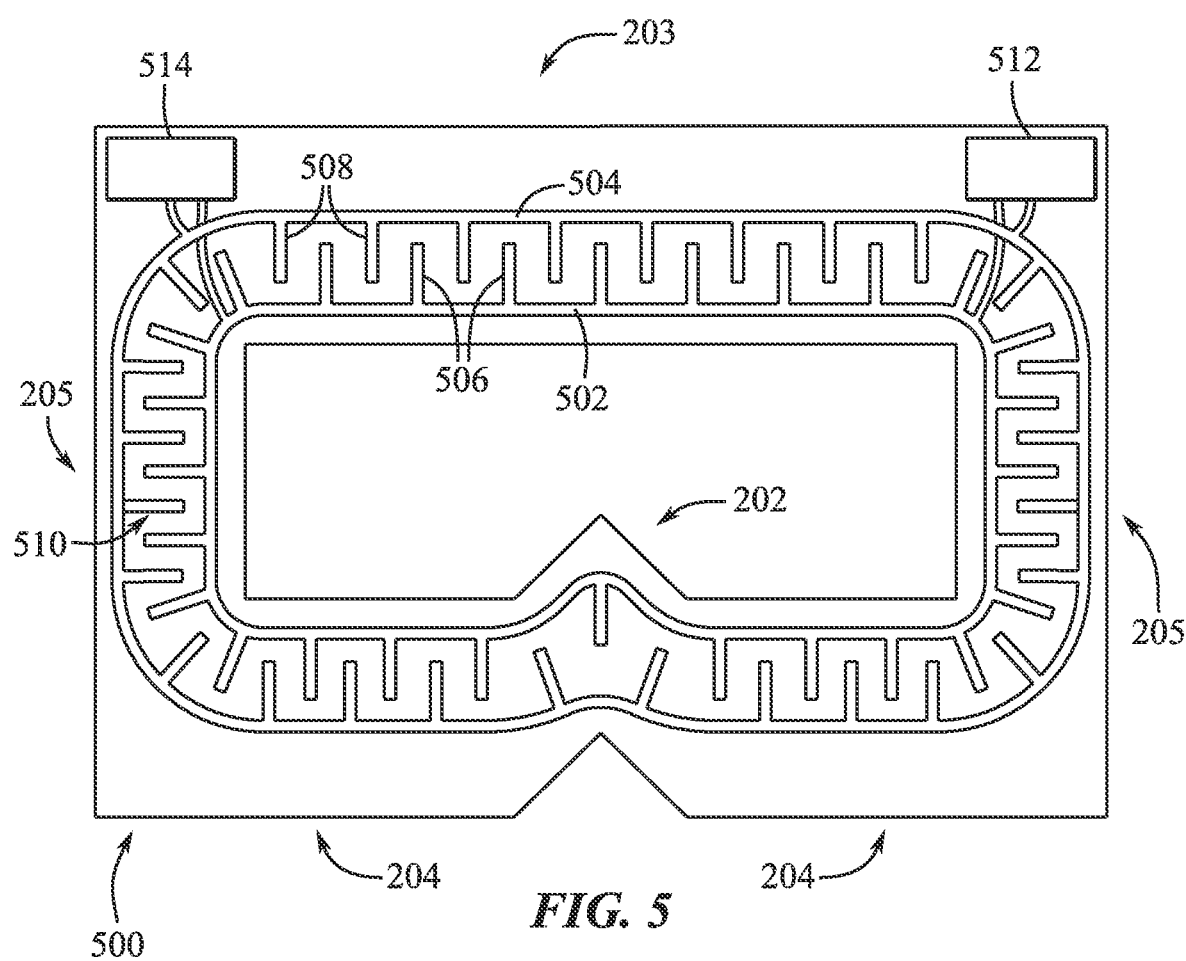
FIG. 5 illustrates yet another example facial interface.

In addition to multiple fluid chambers, facial interfaces of the present disclosure can include extensions (e.g., pneumatic or hydraulic extensions) that can traverse different configurations of the facial interface. FIG. 5 illustrates a facial interface 500 in accordance with one or more examples of the present disclosure.

As shown, the facial interface 500 includes a first pneumatic ring 502 and a second pneumatic ring 504, which are the same as or similar to the first fluid chamber 402 and the second fluid chamber 404, respectively, discussed above in relation to FIG. 4. Differently, however, the facial interface 500 can include extensions in fluid communication with the first pneumatic ring 502 and the second pneumatic ring 504. As used herein, the terms "extensions" or "segments" refer to appendages in fluid communication with a fluid chamber. In some examples, extensions can extend in various directions away from a fluid chamber. In certain examples, extensions can extend into different planes relative to a fluid chamber. For instance, extensions can extend towards an exterior surface of a facial interface (whether towards or away from a user's face). To illustrate, a fluid chamber can provide varying contact points from deeper within the facial interface, while extensions or segments can provide varying contact points from shallower portions within the facial interface (i.e., closer to a user's face).

In particular, the first pneumatic ring 502 includes a first set of extensions 506, and the second pneumatic ring 504 includes a second set of extensions 508. In these or other examples, the first set of extensions 506 and the second set of extensions 508 can be positioned or oriented in a variety of configurations. However, as shown, the first set of extensions 506 extends outwardly towards the second pneumatic ring 504. By contrast, the second set of extensions 508 extends inwardly towards the first pneumatic ring 502.

In at least some examples, the first set of extensions 506 and the second set of extensions 508 define an alternating pneumatic region 510 between the first pneumatic ring 502 and the second pneumatic ring 504. As used herein, the term "alternating pneumatic region" refers to an area where extensions alternate from different pneumatic chambers (or pneumatic rings). For example, an alternating pneumatic region can include a sequence of extensions where a first extension or segment stems from a first pneumatic ring, the next extension or segment stems from a second pneumatic ring, the third extension or segment stems from the first pneumatic ring, the fourth extension or segment stems from the second pneumatic ring, and so forth.

Within the alternating pneumatic region 510, the first set of extensions 506 and the second set of extensions 508 can be oriented in various ways relative to each other (e.g., parallel to each other, angled towards each other, etc.). Similarly, the first set of extensions 506 and the second set of extensions 508 can comprise one or more extension spacings (e.g., intersegment spacings). For instance, the first set of extensions 506 and the second set of extensions 508 can comprise a first spacing along the forehead region 203, a second spacing along the zygoma region 205, a third spacing along the maxilla region 204, and so forth. In other instances, the spacing between the first set of extensions 506 and the second set of extensions 508 can be constant.

Additionally shown in FIG. 5, the facial interface 500 can include a fan 512 and an exhaust 514 in fluid communication with the first pneumatic ring 502 and the second pneumatic ring 504. The fan 512 and the exhaust 514 can be the same as or similar to the fans and exhausts discussed above for the foregoing figures. However, as depicted in FIG. 5, the fan 512 and the exhaust 514 can be positioned on or within the facial interface 500. For example, at least one of the fan 512 or the exhaust 514 can be embedded inside the facial interface 500. In such a case, the fan 512 can intake air from an ambient environment (or other location) via ventilation in the facial interface 500. Likewise, the exhaust 514 can exit air out into an ambient environment (or other location) via ventilation in the facial interface 500. Alternatively, as discussed above, at least one of the fan 512 or the exhaust 514 can be positioned external to the facial interface 500.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6:
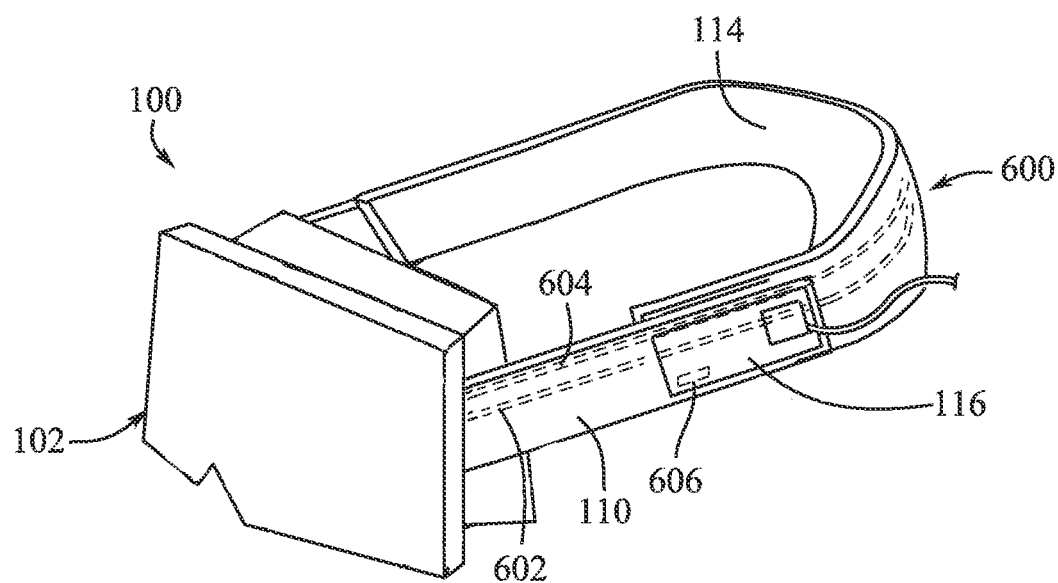
FIG. 6 illustrates a perspective view of another example head-mountable device.

FIG. 6 illustrates an example of the head-mountable device 100 in accordance with one or more examples of the present disclosure. As shown, the device 100 includes at least some of the same or similar features discussed above in relation to FIGS. 1-2B, such as the HMD 102, the removable straps (e.g., the removable strap 110), the electronics pod 116, the retention band 114, and so forth.

In addition, the device 100 can include an adjustable tension mechanism 600. As used herein, the term "adjustable tension mechanism" refers to one or more elements that can change the tension of at least one component retaining the HMD 102 against a user's head. In certain examples, an adjustable tension mechanism includes one or more fluid chambers. In other examples, an adjustable tension mechanism includes tension wires.

As shown, the adjustable tension mechanism 600 includes a first pneumatic chamber 602 and a second pneumatic chamber 604. The first pneumatic chamber 602 and the second pneumatic chamber 604 can be positioned in various locations throughout the device 100. In particular examples, the first pneumatic chamber 602 and the second pneumatic chamber 604 are positioned along the side portions and the rear portions of the device 100. For instance, the first pneumatic chamber 602 and the second pneumatic chamber 604 extend from the HMD 102 (e.g., the facial interface), through at least one of the removable straps (e.g., the removable strap 110), and into the retention band 114. In certain examples, the first pneumatic chamber 602 and the second pneumatic chamber 604 extend entirely through the securement assembly (i.e., through the removable strap 110, through the retention band 114, and through the removable strap 112 not shown). Furthermore, although not shown, the first pneumatic chamber 602 and the second pneumatic chamber 604 can be in fluid communication with one or more pneumatic chambers of the facial interface described above.

In at least some examples, the first pneumatic chamber 602 and the second pneumatic chamber 604 are positioned inside the removable strap 110 and/or the retention band 114. In other examples, the first pneumatic chamber 602 and the second pneumatic chamber 604 are positioned along an exterior surface of at least one of the removable strap 110 and/or the retention band 114.

In these or other examples, the first pneumatic chamber 602 and the second pneumatic chamber 604 can operate the same as or similar to other fluid chambers disclosed herein.

For example, the first pneumatic chamber 602 can actuate at a first time to circulate and/or pump air through the first pneumatic chamber 602 for a certain time period. Subsequently, the second pneumatic chamber 604 can actuate at a second time to circulate and/or pump air through the second pneumatic chamber 602. Accordingly, the first pneumatic chamber 602 and the second pneumatic chamber 604 can actuate at alternating times. In so doing, the first pneumatic chamber 602 and the second pneumatic chamber 604 can provide varying contact points between the user's head 101 and the retention band 114 (e.g., to help improve user comfort).

It will be appreciated that the first pneumatic chamber 602 and the second pneumatic chamber 604 can be actuated in a variety of ways, as discussed above. For example, the first pneumatic chamber 602 and the second pneumatic chamber 604 can actuate at predetermined time intervals, at scheduled times, in response to detected tissue fatigue, in response to a detected temperature, based on a detected blood flow, or based on a particular user activity. In at least some examples, the first pneumatic chamber 602 and the second pneumatic chamber 604 can actuate in response to user interaction (e.g., with a button 606 positioned on or adjacent to the electronics pod 116). For instance, in response to detecting a user input with the button 606 (e.g., indicating user fatigue or soreness), the first pneumatic chamber 602 and the second pneumatic chamber 604 can begin actuation cycles to circulate fluid through at least the retention band 114 on a predetermined schedule. Alternatively, in some examples, the button 606 can be substituted by a dial, slider, or other input mechanism.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6. For example, at least one of the first pneumatic chamber 602 or the second pneumatic chamber 604 can be substituted with tension wires, heating/cooling elements, etc. Additionally, in some examples the present exemplary systems and methods collect user specific data to provide a user specific experience. In such examples, the collection, storage, use, and/or dissemination of the user specific data should be conducted in accordance with well-established and recognized policies and procedures.

The specific details provided herein are not required in order to practice the described embodiments, and are presented for purposes of illustration and description only. They are not intended to be exhaustive or to limit the embodiments to the precise forms disclosed, and many modifications and variations are possible in view of the above teachings.

What is claimed is:

1. A head-mountable device, comprising:
a display portion including a display;
a facial interface defining a fluid chamber comprising:
a first pneumatic chamber extending around the display portion; and
a second pneumatic chamber extending around the first pneumatic chamber;
the fluid chamber being actuatable based on sensor data;
a sensor disposed on or within the facial interface, the sensor configured to generate the sensor data; and
a securement assembly connectable to the display portion, the securement assembly comprising:
a removable strap comprising electronics; and
a retention band connectable to the removable strap.

2. The head-mountable device of claim 1, wherein the fluid chamber of the facial interface comprises:
the first pneumatic chamber formed around the facial interface; and
the second pneumatic chamber formed around the facial interface and positioned adjacent to the first pneumatic chamber.

3. The head-mountable device of claim 2, wherein the first pneumatic chamber and the second pneumatic chamber are independently actuatable.

4. The head-mountable device of claim 1, wherein the facial interface comprises a pneumatic chamber configured to span a forehead region, a zygoma region, and a maxilla region of a human face.

5. The head-mountable device of claim 1, wherein the facial interface comprises:
a pneumatic ring; and
a first pneumatic segment and a second pneumatic segment in fluid communication with the pneumatic ring, the first pneumatic segment and the second pneumatic segment extending away from the pneumatic ring.

6. The head-mountable device of claim 1, further comprising a fan in fluid communication with the fluid chamber.

7. The head-mountable device of claim 1, wherein the securement assembly comprises a pneumatic chamber extending from the facial interface and into the retention band.

8. An apparatus, comprising:
a display portion including a display;
a pneumatic interface comprising:
a first pneumatic chamber, the first pneumatic chamber extending substantially around the display portion;
a second pneumatic chamber, the second pneumatic chamber extending substantially around the display portion and positioned adjacent to the first pneumatic chamber, wherein the first pneumatic chamber and the second pneumatic chamber are independently actuatable;
a fan in fluid communication with the first pneumatic chamber and the second pneumatic chamber; and
an air exhaust in fluid communication with the first pneumatic chamber and the second pneumatic chamber; and
a securement assembly connectable to the display portion.

9. The apparatus of claim 8, wherein the first pneumatic chamber and the second pneumatic chamber each comprise pneumatic extensions.

10. The apparatus of claim 9, wherein:
the pneumatic extensions of the first pneumatic chamber extend outwardly towards the second pneumatic chamber; and
the pneumatic extensions of the second pneumatic chamber extend inwardly towards the first pneumatic chamber.

11. The apparatus of claim 9, wherein the pneumatic extensions for the first pneumatic chamber and the second pneumatic chamber define an alternating pneumatic region between the first pneumatic chamber and the second pneumatic chamber.

12. The apparatus of claim 8, wherein the first pneumatic chamber and the second pneumatic chamber are actuatable at predetermined time intervals.

13. The apparatus of claim 8, wherein the first pneumatic chamber and the second pneumatic chamber are independently actuatable in response to a signal from a processor.

14. The apparatus of claim 13, wherein the signal is generated in response to a detected facial fatigue or a detected temperature.

15. The apparatus of claim 8, wherein the first pneumatic chamber and the second pneumatic chamber are expandable and compressible to vary a contact point between the pneumatic interface and a human face.

16. A wearable apparatus, comprising:
   a display portion including a display;
   a pneumatic facial interface comprising:
      a pneumatic ring; and
      pneumatic extensions in fluid communication with the pneumatic ring; and
   a securement assembly connectable to the display portion;
   wherein the pneumatic facial interface is actuatable in response to a signal from a processor, the signal based on a detected blood flow.

17. The wearable apparatus of claim 16, wherein:
   the pneumatic ring comprises a first pneumatic ring;
   the pneumatic extensions comprise a first set of pneumatic extensions; and
   the wearable apparatus further comprises:
      a second pneumatic ring; and
      a second set of pneumatic extensions in fluid communication with the second pneumatic ring.

18. The wearable apparatus of claim 16, further comprising:
   an air intake in fluid communication with the pneumatic ring; and
   an air exhaust in fluid communication with the pneumatic ring.

19. The wearable apparatus of claim 16, wherein the securement assembly comprises an adjustable tension mechanism including a pneumatic chamber.

* * * * *